United States Patent [19]
Gallagher

[11] 3,763,535
[45] Oct. 9, 1973

[54] METHOD OF MAKING A BALL JOINT LINKAGE

[75] Inventor: Peter Christopher John Gallagher, Hightstown, N.J.

[73] Assignee: NL Industries, Inc., New York, N.Y.

[22] Filed: Sept. 23, 1971

[21] Appl. No.: 183,174

[52] U.S. Cl. ......... 29/149.5 B, 29/156.5 R, 29/441, 287/21
[51] Int. Cl. .......................................... B23p 11/00
[58] Field of Search ............... 29/149.5 B, 156.5 R, 29/156.5 A, 424, 441; 92/224; 264/242; 287/87, 90 R, 90 E, 21

[56] References Cited
UNITED STATES PATENTS

| | | |
|---|---|---|
| 2,252,351 | 8/1941 | Paulus ............................ 29/149.5 B |
| 3,049,800 | 8/1962 | Neff et al. ............................ 29/441 |
| 3,174,811 | 3/1965 | Schmidt et al. ....................... 308/72 |
| 3,191,264 | 6/1965 | Underwood et al. ............. 29/424 X |
| 3,205,027 | 9/1965 | Hilton ....................... 29/149.5 B X |
| 3,239,589 | 3/1966 | White ................................. 264/242 |
| 3,241,893 | 3/1966 | Haller ................................. 308/121 |
| 3,402,644 | 9/1968 | Geiger et al. .......................... 92/224 |
| 3,564,575 | 2/1971 | Catherall ....................... 29/156.5 R |
| 3,654,683 | 4/1972 | White .................................. 29/424 |

*Primary Examiner*—Thomas H. Eager
*Attorney*—Robert L. Lehman et al.

[57] ABSTRACT

A connecting rod has a ball formed at an end thereof. A unitary piston is cast about the ball, and upon solidification, irremovably captures the ball within the piston body.

9 Claims, 3 Drawing Figures

PATENTED OCT 9 1973 3,763,535

INVENTOR
P. C. J. GALLAGHER
BY
Jay P. Gordon
ATTORNEY ized 3,763,535

METHOD OF MAKING A BALL JOINT LINKAGE

BACKGROUND

The present invention relates to a new type of piston-connecting rod linkage and the method of manufacture thereof.

In conventional piston-connecting rod linkages the coupling of the two parts has traditionally been effected by means of a cylindrical bearing held in place by clips. Bosses communicate with an opening in the connecting rod. A cylindrical bearing passes through the bosses and cylindrical opening to effect a coupling. Clips are employed to maintain the bearing in its coupling position.

The arrangement above described requires several machinings to effect a workable coupling. Since such linkages are produced in the millions of units, elimination of any machining at all can result in appreciable savings in manufacturing costs. The present invention provides a structurally adequate linkage which requires relatively little machining in its formation.

In the prior art, many pistons have casting reentrances which effectively negate the possibility of casting the piston about a single core. Obviously, a substantial savings can be realized by a method in which a piston is cast about a single, unitary core.

In the prior art many examples of ball and socket connecting rod-piston inkages exist. For the most part these embodiments also require considerable machining to effect their manufacture. As an example, the linkage may be effected by bolting accurately machined seatings around the ball. Clearly much effort and cost is involved in this procedure and careful workmanship is necessary if the linkage is to have the correct tolerance and thus operate satisfactorily. As another example, the linkage may be effected by upsetting metal around the ball. It is difficult to perform this procedure with sufficient accuracy to lead to the instantaneous formation of a workable ball-and-socket joint. In the prior art, resort has been made in some instances to the introduction of a lapping compound to the joint. Then working the respective members against each other will lead to the development of the correct tolerance at which point the abrasive compound can be flushed out. In the prior art of the ball-and-socket joints resort has also been made to coating the ball with a soluble layer before forming the socket. In this approach the layer is leached out subsequently so as to provide the requisite clearance in the joint. Yet another practice has been to coat the ball with a layer of plastic material which serves to promote conformity between the coated ball and the inner dimensions of the socket. In the instant invention the ball itself is used as the form which determined the dimensions of the cast socket, so that a joint with the desirable tolerance can be fabricated at will. Control over the degree of clearance between the external surface of the ball and the socket interior can be effected in several ways. These include choice of the casting alloy in that shrinkage on solidification and cooling varies from one alloy to another. Further, the pressure applied to the liquid metal during the casting process has been found to influence the clearance in the joint. In addition, the ball may be heated or cooled during the casting procedure so as to alter its size by thermal contraction or expansion from the dimensions it would have in actual service.

SUMMARY

It is a primary object of the present invention to provide a piston-connecting rod linkage which is simple, light, effective and inexpensive to manufacture.

Another object of the present invention is the provision of a piston-connecting rod linkage which utilizes, in its final configuration, all the intermediate materials of manufacture.

Yet another object of the present invention is the provision of a piston-connecting rod linkage in which the coupling means lie in the same plane as the piston ring lands of the piston.

A connecting rod has a ball formed at an end thereof. A piston is cast about the ball, which piston irremovably captures the ball within the piston body, effecting a coupling which is substantially internal with respect to the piston. Lubrication reservoirs are formed in the ball and a lubrication passage is provided in the piston body which communicates with the reservoirs. During movement of the linkage, lubricant leaks from the reservoirs into the ball - piston interface. In embodiments where the ball is spherical, the piston is capable of partial rotational movement about the connecting rod, restricted only by the connecting rod contacting the cast surfaces of the piston body. Where the ball is ovoid, the piston is capable of circular movement about a single axis as limited by the cast surfaces of the piston body.

These and other objects of the present invention will be evident as the description continues.

DETAILED DESCRIPTION

Figure 1:
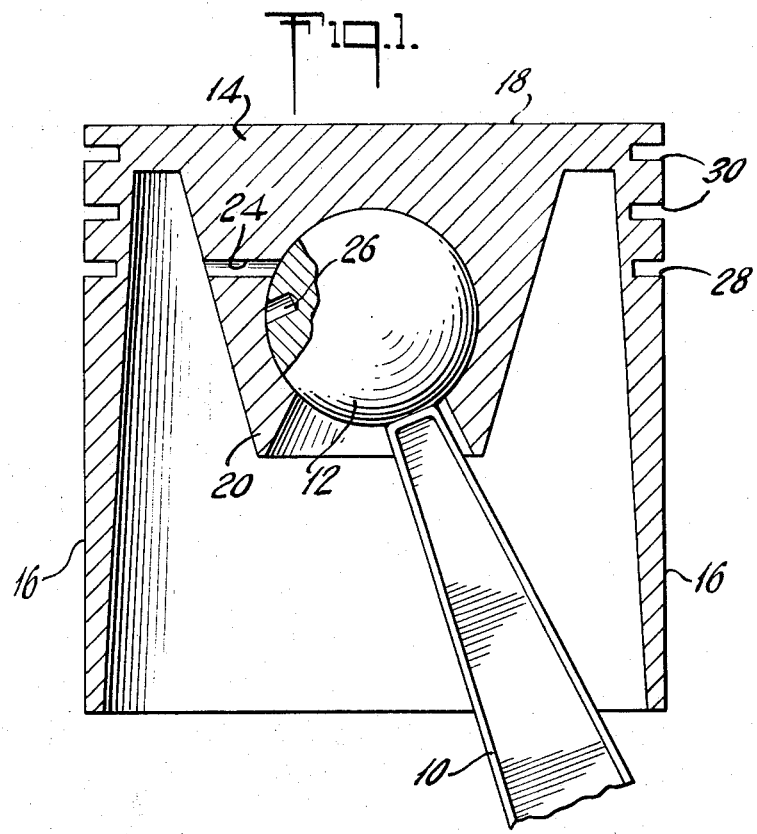
FIG. 1, illustrates the piston-connecting rod linkage partially in cross section.
Figure 2:
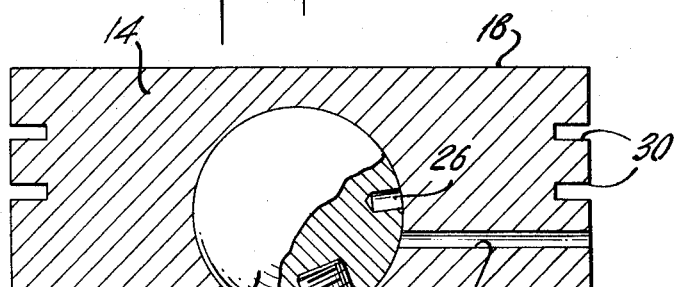
FIG. 2, illustrates an alternate embodiment of the present invention.
Figure 3:
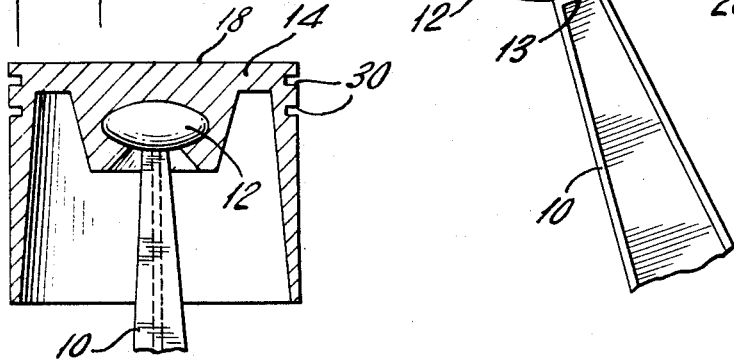
FIG. 3, illustrates an alternate embodiment of the present invention showing an ovoid ball.

Referring to FIG. 1, there is illustrated, basically, a conventional type connecting rod 10, well known in the art. However, at the upper end of that connecting rod 10 there is formed a ball 12. That ball 12 can be spherical or ovoid (FIG. 3). It can be made of a like, or other suitable material, as that of the connecting rod 10, and in one embodiment of the present invention, the spherical ball 12 and rod 10, are integrally constructed. An alternative construction calls for a threaded hole 13 (FIG. 2) to be formed in the ball 12, the threads of which are designed to mate with external threads formed on the end of the connecting rod 10.

To effect the linkage of the connecting rod 10 and the piston 14, the piston 14 is actually formed about the ball 12. A preferred method of forming the piston 14 is to cast directly about the ball 12. To effect such a casting, the ball 12 may be placed in a properly designed mold, and then molten material is introduced into that mold. Once the material hardens the ball 12 is irremovably captured within the body of piston 14. In the embodiment here illustrated, the piston 14 consists of the depending skirts 16, the head or power section 18, and the internal boss 20. It is that boss 20 which captures the ball 12. Obviously, it is possible to cast a solid piston; however, where weight considerations are important a hollowed configuration, as here illustrated, is quite functional.

To be noted at this point is that the piston 14, as here illustrated, can be fabricated in a one piece mold. This is true because there are not "reentrances" in the piston body which would necessitate sectional molding. The cost savings involved, when considering millions of units, may be considerable. Obviously, the internal geometry of the piston 14, can be varied without introducing reentrances, to produce the proper weight-strength ratio as may be desired.

A passage 24 may be formed in boss 20, and that passage 24 serves to conduct lubricant into the reservoir 26 formed in the ball 12. As the ball 12 rotates within the boss 20 lubricant leaks from the reservoir onto the interface between the ball 12 and the boss 20. It should be obvious that several reservoirs as well as passages may be provided to produce the desired amount of lubrication. Lubrication reaches the passage 24 by means of the oil ring land 28.

At this point one particular feature of the present invention is worth noting. As previously stated, the internal geometry of the piston 14 is quite variable. This means that the ball 12 can be captured within the boss 20 at a variety of axial positions (the axis of piston 14). For instance, the boss 20 may be elongated, thus, capturing the ball 12 at a point very close to the end of the piston skirt 16. Alternatively, as illustrated in FIG. 2, the ball may be captured within a shortened boss such that the planes of the piston ring lands 30 pass through the ball 12. Such an embodiment permits a shorter piston and hence a greater weight savings. This feature is not present in much of the prior art since it has been necessary for the coupling elements to extend past the periphery of the piston 14. Since the piston ring lands 30 must be continuous, conventional linkages have been unable to accommodate a coupling which lies in the same planes as the piston ring lands 30.

An additional cost savings feature of the instant invention is produced by the shape of the piston head. Most conventional pistons are expensive to machine, since, because of peculiar stress distributions, they are not symmetrical and require expensive elliptical grinding to compensate for such distributions. In the instant invention, the piston is symmetrical which renders such grinding unnecessary.

The present invention possesses the capability of utilizing all intermediate components in the final linkage. Specifically, when casting the piston 14 about the ball 12 it is necessary that the materials of the ball surface and the casting medium be chosen so as to prevent the two parts from becoming a single unitary casting. In one embodiment of the present invention, the ball 12 is plated with a suitable interface coating, or material. such as bronze and the piston 14 is then cast about the ball 12. Once the cast has solidified, the linkage is operational since lubricant may be introduced to the ball and socket interface. In an alternative embodiment, the ball 12 is coated with a suitable bearing material which, after casting, transfers from the ball 12 to the mating piston 14 surface to form the necessary bearing surface. Electrolysis and immersion bath coating are acceptable alternatives. As previously indicated, in an embodiment where the ball and rod are formed of dissimilar metals, a bearing interface may be automatically formed without any coating of the ball.

It has been seen that the present invention presents a marked improvement in the prior art. A cheaper and lighter piston-connecting rod linkage is the end product of a rather inexpensive and uncomplicated method.

It is obvious that variations may be made in the details of the instant invention without departing from the scope of the appended claims.

I claim:

1. A method for fabricating an articulated connecting rod - piston linkage characterized by a pressure casting operation comprising the steps of: providing a mold cavity having the configuration of a piston including a piston head portion, mounting a connecting rod ball in said mold cavity, introducing molten material into said mold cavity to form a piston having said ball irremovably captured therein, said material introduced into said mold cavity at a pressure selected to provide clearance between said ball and said piston whereby said ball is capable of rotational movement relative to said piston, and removing the articulated connecting rod ball - piston linkage from said mold cavity.

2. A method for fabricating an articulated connecting rod - piston linkage according to claim 1 wherein the ball and the piston are formed of dissimilar materials.

3. A method for fabricating an articulated connecting rod - piston linkage according to claim 1 wherein the ball is coated with a bearing material prior to being mounted in said mold cavity.

4. A method for fabricating an articulated connecting rod - piston linkage according to claim 3 wherein said ball and said piston are formed of metal and the bearing material on said ball is bronze.

5. A method for fabricating an articulated connecting rod - piston linkage according to claim 1 wherein said mold cavity includes a portion designed to form an integral boss on the underside of the piston head portion of said piston, and said connecting rod ball is mounted in the portion of said mold cavity corresponding to the molded boss wherein said connecting rod ball is irremovably captured in the molded boss.

6. A method for fabricating an articulated connecting rod - piston linkage according to claim 5 wherein the portion of said mold cavity designed to form said integral boss is in the portion of said mold cavity corresponding to the upper half of said piston and said connecting rod ball is mounted in the boss-portion of said mold cavity substantially intermediate the upper and lower extremities of said boss-portion.

7. A method for fabricating an articulated connecting rod - piston linkage according to claim 1 wherein a connecting rod is attached to said ball.

8. A method for fabricating an articulated connecting rod - piston linkage according to claim 1 wherein said ball is spherical.

9. A method for fabricating an articulated connecting rod - piston linkage according to claim 1 wherein said ball is ovoidal.

* * * * *